US012573529B2

(12) United States Patent 
Inui et al.

(10) Patent No.: US 12,573,529 B2 
(45) Date of Patent: Mar. 10, 2026

(54) ELECTRONIC COMPONENT

(71) Applicant: TDK CORPORATION, Tokyo (JP)

(72) Inventors: Kyosuke Inui, Tokyo (JP); Terumasa Toyoda, Tokyo (JP); Toru Tonogai, Tokyo (JP); Yuichi Oyanagi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 217 days.

(21) Appl. No.: 17/723,808

(22) Filed: Apr. 19, 2022

(65) Prior Publication Data

US 2022/0344086 A1 Oct. 27, 2022

(30) Foreign Application Priority Data

Apr. 21, 2021 (JP) ................................. 2021-071921

(51) Int. Cl.

| | |
|---|---|
| *H01F 1/26* | (2006.01) |
| *B32B 3/26* | (2006.01) |
| *B32B 3/30* | (2006.01) |
| *H01F 1/147* | (2006.01) |
| *H01F 1/153* | (2006.01) |
| *H01F 1/24* | (2006.01) |

(Continued)

(52) U.S. Cl.
CPC .............. *H01F 1/24* (2013.01); *B32B 3/263* (2013.01); *B32B 3/30* (2013.01); *H01F 1/1475* (2013.01); *H01F 1/14758* (2013.01); *H01F 1/14791* (2013.01); *H01F 1/15308* (2013.01); *H01F 1/15333* (2013.01); *H01F 1/26* (2013.01); *H01F 27/255* (2013.01); *H01F 2017/048* (2013.01); *Y10T 428/12014*

(2015.01); *Y10T 428/12361* (2015.01); *Y10T 428/12389* (2015.01); *Y10T 428/12396* (2015.01); *Y10T 428/12556* (2015.01); *Y10T 428/12569* (2015.01); *Y10T 428/12993* (2015.01); *Y10T 428/26* (2015.01)

(58) Field of Classification Search
CPC .............. H01F 1/1475; H01F 1/14758; H01F 1/14791; H01F 1/15308; H01F 1/15333; H01F 1/24; H01F 1/26; H01F 27/255; H01F 2017/048; Y10T 428/12014; Y10T 428/12361; Y10T 428/12389; Y10T 428/12396; Y10T 428/12556; Y10T 428/12569; Y10T 428/12992; Y10T 428/26; B32B 3/30; B32B 3/263
See application file for complete search history.

(56) References Cited

U.S. PATENT DOCUMENTS

| | | | | |
|---|---|---|---|---|
| 2013/0255071 A1* | 10/2013 | Muneuchi | ............. | H01F 27/292 29/605 |
| 2018/0096775 A1* | 4/2018 | Shibuya | ................. | H01F 41/02 |

(Continued)

FOREIGN PATENT DOCUMENTS

JP 2018-056475 A 4/2018

*Primary Examiner* — Michael E. La Villa 
(74) *Attorney, Agent, or Firm* — Oliff PLC

(57) ABSTRACT

An element body 4 includes a metal particle dispersion element 15 in which metal particles 12 are dispersed. A surface of the metal particle dispersion element 15 includes an indicator area 10. The indicator area 10 includes a recess 10a having a predetermined depth measured from a reference plane L of the metal particle dispersion element 15. The predetermined depth D1 is deeper than D50 of the metal particles 12 included in the metal particle dispersion element 15.

5 Claims, 6 Drawing Sheets

(51) Int. Cl.
    *H01F 27/255*     (2006.01)
    *H01F 17/04*     (2006.01)

(56)           References Cited

U.S. PATENT DOCUMENTS

2019/0318854 A1 * 10/2019 Park ........................ B22F 1/052
2020/0350110 A1   11/2020 Shibuya et al.
2021/0098183 A1 *  4/2021 Araki ................... H01F 41/127

* cited by examiner

FIG. 3

| Sample No | Power | Print number of times | Speed | Reat percentage | Depth D1 | Width W1 | AS ratio | Cross-sectional structure |
|---|---|---|---|---|---|---|---|---|
| 1 | 100% | 300% | 300mm/s | 100% | 23.4 | 77.7 | 3.32 | |
| 2 | 100% | 300% | 300mm/s | 100% | 28.3 | 68.9 | 2.43 | |
| 3 | 100% | 300% | 300mm/s | 100% | 22.5 | 73.9 | 3.28 | |
| 4 | 100% | 300% | 300mm/s | 100% | 20.7 | 111 | 5.36 | |
| 5 | 100% | 300% | 300mm/s | 100% | 21.2 | 98.4 | 4.64 | |
| 6 | 100% | 100% | 300mm/s | 0% | 3.5 | 37.3 | 10.66 | |

FIG. 4

| Sample No | Power | Print number of times | Speed | Bond percentage | Depth D1 | Width W1 | AS ratio | Cross-sectional structure |
|---|---|---|---|---|---|---|---|---|
| 10 | 100% | 100% | 300mm/s | 0% | 6.57 | 59.3 | 9.03 | |
| 11 | 100% | 100% | 300mm/s | 0% | 5.56 | 42.9 | 7.72 | |
| 12 | 100% | 100% | 300mm/s | 0% | 7.32 | 43.4 | 5.93 | |
| 13 | 80% | 300% | 70mm/s | 29% | 45.8 | 65.5 | 1.43 | |
| 14 | 80% | 300% | 70mm/s | 29% | 44.2 | 56.8 | 1.29 | |
| 15 | 80% | 300% | 70mm/s | 29% | 52.6 | 84.5 | 1.60 | |

ELECTRONIC COMPONENT

TECHNICAL FIELD

The present invention relates to an electronic component including an indicator area where information is easily encoded and is read with few reading errors.

BACKGROUND

As shown in Patent Literature 1 for example, a surface of an electronic component is provided with an indicator area where symbols or characters, such as a model number of the electronic component, a manufacturing lot number, an identification symbol representing performance of the electronic component, and other identification symbols an orientation of the electronic component), may be marked. The characters and the symbols (including barcodes, two-dimensional codes, and the like) provided in the indicator area may be formed by laser engraving.

It is recommended that the characters and the symbols marked in the indicator area should be laser engraved deeply on the surface of the electronic component in order to prevent misreading of them. It has been conventionally difficult to read information from the indicator area unless the surface of the electronic component is relatively deeply engraved, regardless of a particle size of particles constituting an element body of the electronic component.

Patent Literature 1: JP Patent Application Laid Open No. 2018-56475

BRIEF SUMMARY OF THE INVENTION

The prevent invention has been achieved under such circumstances. It is an object of the invention to provide an electronic component that can be formed with a convenient method and includes an indicator area where information is read with few reading errors.

To achieve the above object, the present inventors have completed the present invention through diligent consideration in which they have found that forming a recess with a predetermined depth determined in relation to a particle size of particles constituting an element body of an electronic component in its indicator area enables relatively accurate reading of information.

An electronic component according to a first aspect of the present invention is an electronic component comprising an element body, wherein the element body includes a metal particle dispersion element in which metal particles are dispersed, a surface of the metal particle dispersion element includes an indicator area, the indicator area includes a recess having a predetermined depth measured from a reference plane of the metal particle dispersion element, and the predetermined depth is shallower than D90 of the metal particles included in the metal particle dispersion element.

An electronic component according to a second aspect of the present invention is an electronic component comprising an element body, wherein the element body includes a sintered particle dispersion element in which sintered particles are dispersed, a surface of the sintered particle dispersion element includes an indicator area, the indicator area includes a recess having a predetermined depth measured from a reference plane of the sintered particle dispersion element, and the predetermined depth is shallower than D90 of the sintered particles included in the sintered particle dispersion element.

At the indicator area on the surface of the element body of the electronic component of the present invention, the recess is formed by, for example, laser irradiation, in accordance with a particle size distribution of the metal particles (or the sintered particles; the same applies hereafter) included in the metal particle dispersion element (or the sintered particle dispersion element; the same applies hereafter) so that the recess is not deeply engraved but has a depth shallower than D90 of the metal particles. The present inventors have found that the above configuration improves information reading accuracy.

The recess is formed through energy light (e.g., lasers irradiation. A laser output at the time of irradiation may be smaller than a conventionally required laser output, and the recess can be formed with a small amount of irradiation time. Consequently, an indicator (e.g., a barcode and a two-dimensional code) can be marked on a surface of the element body easily and directly. Formation of an elaborate indication pattern is also made possible, and formation of the indicator area on an extremely small electronic component is also enabled.

An electronic component according to a third aspect of the present invention is an electronic component comprising an element body, wherein the element body includes a metal particle dispersion element in which metal particles are dispersed, a surface of the metal particle dispersion element includes an indicator area, the indicator area includes a recess having a predetermined depth measured from a reference plane of the metal particle dispersion element, and the predetermined depth is deeper than D50 of the metal particles included in the metal particle dispersion element.

The present inventors have found that the above configuration improves information reading accuracy. The recess is formed through energy light (e.g., laser) irradiation. A laser output at the time of irradiation may be smaller than a conventionally required laser output, and the recess can be formed with a small amount of irradiation time. Consequently, an indicator (e.g., a barcode and a two-dimensional code) can be marked on a surface of the element body easily and directly. Formation of an elaborate indication pattern is also made possible, and formation of the indicator area on an extremely small electronic component is also enabled.

An aspect ratio calculated by dividing an opening width of the recess by the predetermined depth is preferably larger than 2 and smaller than 5.5. The present inventors have found that the above configuration further improves information reading accuracy.

The metal particle dispersion element may be a resin in which the metal particles are dispersed or may be solely constituted by the dispersed metal particles. An inner surface of the recess may include a resin-rich portion, and a surface of the element body may also include the resin-rich portion.

In using a method of reading information from the electronic component of the present invention, information included in the indicator area is read from a reflected light reflected off a red light or specific light having a wavelength shorter than that of a red light emitted to the indicator area of any electronic component described above. The specific light preferably has a wavelength shorter than that of a green light, more preferably has a wavelength shorter than that of a blue light, and is particularly preferably a UV light.

BRIEF DESCRIPTION OF THE DRAWING(S)

FIG. 3 is a schematic chart showing a relationship between a depth, an aspect ratio (AS ratio), and a read percentage of a recess in an example and a comparative example of the present invention.

FIG. 4 is a schematic chart showing a relationship between a depth, an aspect ratio (AS ratio), and a read percentage of a recess in a comparative example of the present invention.

DETAILED DESCRIPTION OF THE INVENTION

Hereinafter, the present invention is described based on an embodiment shown in figures.

Figure 1:
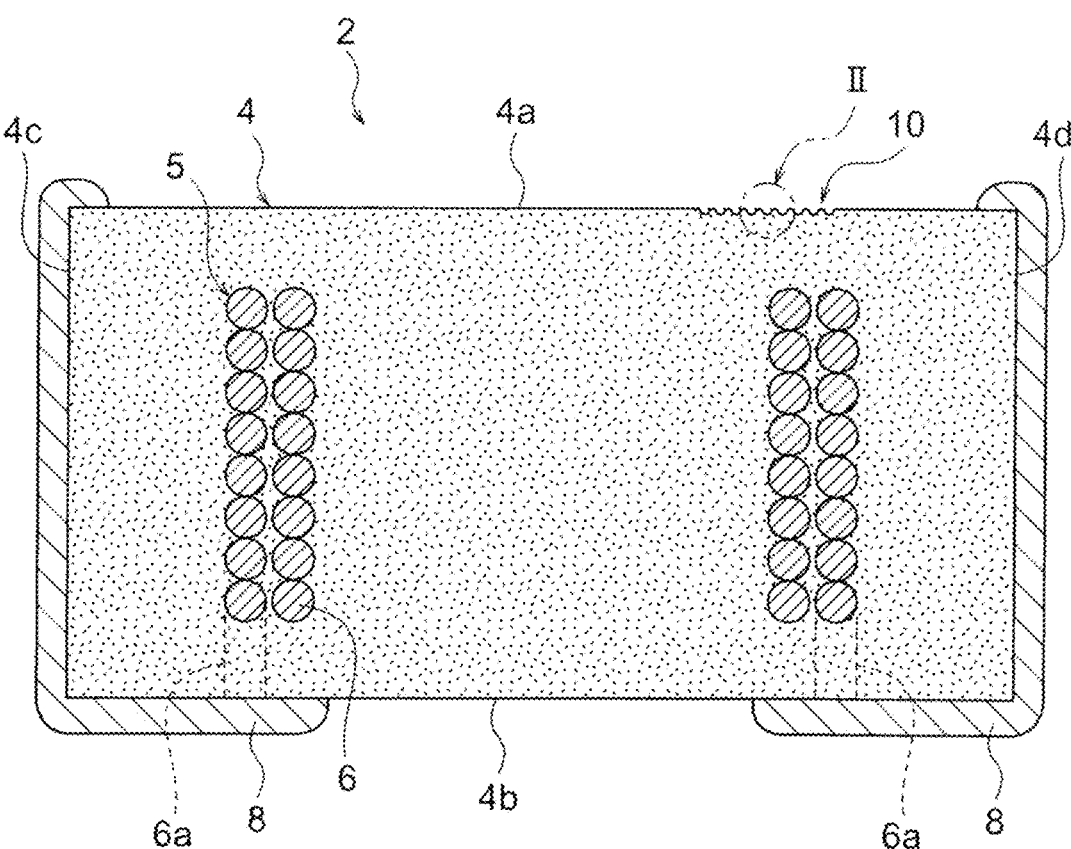
FIG. 1 is a schematic cross-sectional view of an electronic component according to an embodiment of the present invention.
Figure 1:
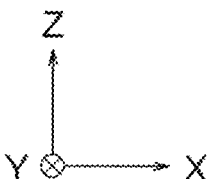

As shown in FIG. 1, an inductor 2 as an electronic component according to an embodiment of the present invention includes an element body 4 having a substantially rectangular parallelepiped shape (substantially hexahedral shape).

The element body 4 includes an upper surface 4a, a bottom surface 4b located on an opposite side of the upper surface 4a in a Z-axis direction, end surfaces 4c and 4d located on sides opposite each other along an X-axis, and end surfaces located on sides opposite each other along a Y-axis (not shown). Dimensions of the element body 4 are not limited. For example, the dimension of the element body 4 in the X-axis direction can be 1.2 to 6.5 mm, the dimension thereof in the Y-axis direction can be 0.6 to 6.5 mm, and the dimension thereof in the Z-axis direction (height) can be 0.5 to 5.0 mm.

A pair of terminal electrodes 8 is formed on the bottom surface 4b of the element body 4. The pair of terminal electrodes 8 is formed separately from each other in the X-axis direction and is insulated from each other. Each of the terminal electrodes 8 is formed so that it is formed not only on the bottom surface 4b of the element body 4 but also continues toward a corresponding nearby portion of the end surface 4c or the end surface 4d.

In the inductor 2 of the present embodiment, an external circuit can connect to the terminal electrodes 8 through an interconnection (not illustrated) or the like. Additionally, the inductor 2 can be mounted on various substrates (e.g., circuit substrates) using a joining member (e.g., solder or conductive adhesive). When the inductor 2 is mounted on a substrate, the bottom surface 4b of the element body 4 is a mounting surface, and the terminal electrodes 8 are joined to the substrate using a joining member.

The element body 4 includes a coil 5 inside. The coil 5 includes a wire 6 wound in a coil shape as a conductor. In FIG. 1 of the present embodiment, the coil 5 is an air core coil wound in a typical normal-wise manner. However, a pattern of winding the wire 6 is not limited. For example, the coil 5 may be an a-winding air core coil, a flat wound air core coil, or an edgewise wound air core coil.

The wire 6 includes a conductor portion that mainly contains low resistance metal (e.g., copper) and an insulating layer covering an outer periphery of the conductor portion. More specifically, the conductor portion includes pure copper (e.g., oxygen-free copper and tough pitch copper), an alloy containing copper (e.g., phosphor bronze, brass, red brass, beryllium copper, and a silver-copper alloy), a copper-coated steel wire, or the like. On the other hand, a material of the insulating layer is not limited as long as the insulating layer has electrical insulating properties. Examples of the material include an epoxy resin, an acrylic resin, polyurethane, polyimide, polyamide-imide, polyester, nylon, and the like, or a synthetic resin in which at least two kinds of the above resins are mixed. Additionally, although the wire 6 of the present embodiment is a round wire and a cross section of the conductor portion has a circular shape as shown in FIG. 1, the wire 6 is not limited to a round wire and may be a flat wire or the like.

Figure 2:
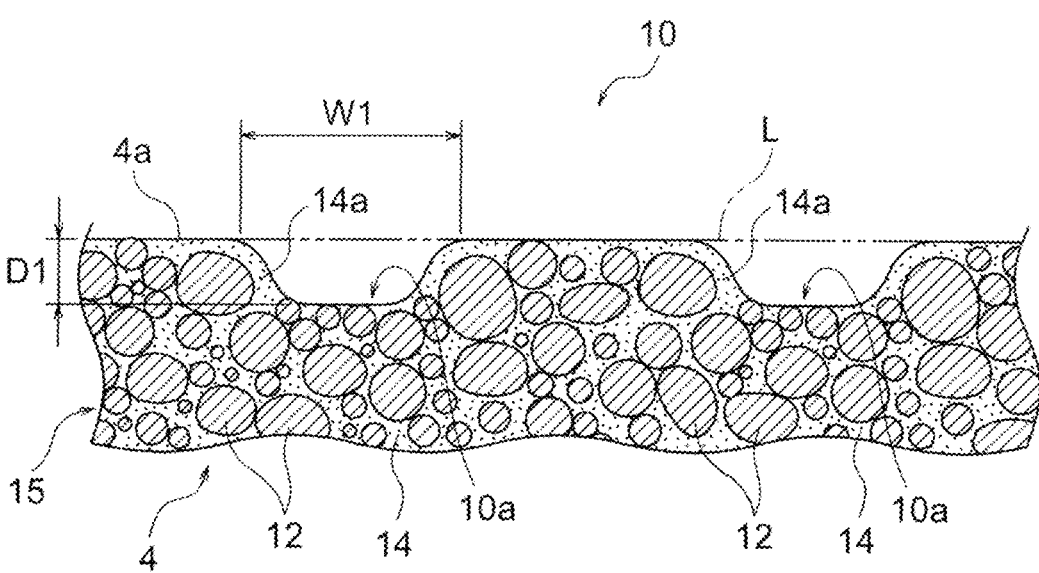
FIG. 2 is an enlarged cross-sectional view of an indicator area shown in II in FIG. 1.
Figure 2:
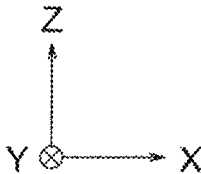

As shown in FIG. 2, the element body 4 of the present embodiment can include a green compact containing, for example, metal particles 12 and a resin 14. A material of the metal particles 12 is not limited as long as the metal particles are magnetic materials. Examples of the material include an Fe—Ni alloy, an Fe—Si alloy, an Fe—Co alloy, an Fe—Si—Cr alloy, an Fe—Si—Al alloy, an amorphous alloy containing Fe, a nano-crystalline alloy containing Fe, and other soft magnetic alloys. Note that, subcomponents may be appropriately added to the metal particles 12.

The metal particles 12 included in the element body 4 may have a median diameter (D50) of about 0.1 μm to about 100 μm, preferably 5 μm or more, and more preferably 10 μm or more. An upper limit of D50 is preferably 20 μm or less and more preferably 15 μm or less. When a particle size distribution is as described above, a read percentage of data at an indicator area 10 improves due to a relationship between the particle diameter distribution and a depth of a recess 10a described later.

The metal particles 12 may include a mixture of large particles with a D50 of 10 to 50 μm, medium particles with a D50 of 1 to 9 μm, and small particles with a D50 of 0.3 to 0.9 μm. Alternatively, a combination of the large particles and the medium particles, a combination of the large particles and the small particles, a combination of the medium particles and the small particles, or the like may be used, other than the combination of the three particle groups as described above. Note that, the large particles, the medium particles, and the small particles may be constituted by the same material or may be constituted by different materials.

When the particle groups are mixed as described above, a content ratio of each particle group is not limited. For example, when the three particle groups (the large particles, the medium particles, and the small particles) are mixed, the large particles occupy preferably 5% to 30%, the medium particles occupy preferably 0% to 30%, and the small particles occupy preferably 50% to 90% of a total area (100%) occupied by the large particles, the medium particles, and the small particles in a cross section of the element body 4. With the metal particles 12 including a plurality of particle groups, the metal particles 12 included in the element body 4 can have an improved packing density.

As a result, various characteristics of the inductor 2 improve, such as permeability, eddy current loss, and DC bias characteristic.

The particle size and the particle size distribution of the metal particles 12 and the areas occupied by the particle groups can be measured by observing a cross section of the element body 4 with a scanning electron microscope (SEM), a scanning transmission electron microscope (STEM), or the like and performing image analysis of an obtained cross-sectional photograph with software. At this time, the particle size of the metal particles 12 is preferably measured in terms of a circle equivalent diameter.

The metal particles 12 included in the element body 4 may be insulated from each other. One example of an insulating method is a method of forming an insulating layer on a particle surface. Examples of the insulating layer include a film formed from a resin or an inorganic material, and an oxidized film formed by oxidizing the particle surface through heat treatment. When the insulating layer is formed from a resin or an inorganic material, the resin may be a silicone resin, an epoxy resin, or the like.

Examples of the inorganic material include phosphates (e.g., magnesium phosphate, calcium phosphate, zinc phosphate, and manganese phosphate), silicates (e.g., sodium silicate (water glass)), soda lime glass, borosilicate glass, lead glass, aluminosilicate glass, borate glass, and sulfate glass. Note that, the insulating layer of the metal particles 12 has a thickness of preferably 5 to 200 nm. Forming the insulating layer can improve insulation properties among the particles and a withstand voltage of the inductor 2.

A material of the resin 14 included in the element body 4 is not limited. The material can be, for example, a thermosetting resin (e.g., an epoxy resin, a phenol resin, a melamine resin, a urea resin, a furan resin, an alkyd resin, a polyester resin, and a diallyl phthalate resin), a thermoplastic resin (e.g., an acrylic resin, polyphenylene sulfide (PPS), polypropylene (PP), and a liquid crystal polymer (LCP)), or the like. The amount of the resin 14 can be 2.0 to 10 parts by weight with respect to 100 parts by weight of the metal particles.

As shown in FIG. 1, a pair of lead portions 6a at both ends of the wire 6 that constitutes the coil 5 is exposed to an outer surface (e.g., the bottom surface 4b) of the element body 4 from the coil 5 and is connected to each of the corresponding terminal electrodes 8. Although the lead portions 6a include the wire 6, its portion exposed to the bottom surface 4b has the conductor portion of the wire 6 exposed, having the insulating layer on the outer periphery of the wire 6 removed.

In the present embodiment, the terminal electrodes 8 may include a resin electrode layer. Additionally, the terminal electrodes 8 may have a stacked structure including the resin electrode layer and other electrode layers. When the terminal electrodes 8 have the stacked structure, the resin electrode layer is positioned so as to be in contact with the bottom surface 4b of the element body 4, and the other electrode layers may include a single layer or a plurality of layers whose material is not limited. For example, the other electrode layers can include a metal such as Sn, Au, Cu, Ni, Pt, Ag, and Pd, or an alloy containing at least one kind of the above metal elements. The other electrode layers can be formed by plating or sputtering. The terminal electrodes 8 have an entire thickness of preferably 3 to 60 μm on average, and the resin electrode layer has a thickness of preferably 1 to 50 μm.

The resin electrode layer of the terminal electrodes 8 includes a resin component and a conductor powder. The resin component in the resin electrode layer includes a thermosetting resin, such as an epoxy resin and a phenol resin. On the other hand, the conductor powder can include a metal powder such as a Ag, Au, Pd, Pt, Ni, Cu, or Sn powder, or an alloy powder containing at least one kind of the above elements. Particularly, the conductor powder preferably contains Ag as a main component.

The conductor powder can have a shape close to a sphere, a long spherical shape, an irregular block shape, a needle shape, or a flat shape, and particularly preferably has the needle shape or the flat shape. In the present embodiment, flat shaped particles mean particles having an aspect ratio (ratio of a length in a longitudinal direction to a length in a short-side direction) of 2 to 30 in a cross section of the resin electrode layer. The average particle size of the conductor powder can be measured by observing the cross section of the resin electrode layer with a SEM or a STEM and performing image analysis of an obtained cross-sectional photograph. In this measurement, the average particle size of the conductor powder is calculated in terms of a maximum length.

An area occupied by the conductor powder is preferably 60% or less in 100% of a total area occupied by the resin component and the conductor powder in a cross section of the resin electrode layer.

In the present embodiment, a single or a plurality of indicator areas 10 are formed on the upper surface 4a (or other surfaces) of the element body 4. An area of each indicator area 10 is not limited and is, for example, about $\frac{1}{20}$ to about $\frac{18}{20}$ of the area of the upper surface 4a of the element body 4.

The element body 4 includes a metal particle dispersion element 15, in which the metal particles 12 (magnetic materials) are dispersed in the resin 14, as shown in FIG. 2. When the element body 4 is molded inside a mold, outer surfaces of the element body 4 are surfaces that come in contact with the mold. The upper surface 4a partly constituting the outer surfaces is a flat surface along an inner surface of the mold and has a surface roughness to some extent. However, a reference plane L can be specified. The reference plane L can be specified as, for example, a plane including a center line (an average line) of the surface roughness, measured with JIS B0601 or the like, of a surface of the element body 4 on which the recess 10a is not formed.

In the indicator area 10 of the present embodiment, at least a single recess 10a corresponding to an identification pattern (e.g., a two-dimensional barcode) is formed on the upper surface 4a of the element body 4. The recess 10a is formed in a mortar shape, is sunk in the Z-axis direction on the reference plane L of the upper surface 4a, and has a predetermined depth D1 and a predetermined opening width W1. The predetermined depth D1 is defined as a maximum depth of the recess 10a measured from the reference plane L. The opening width W1 is defined as a length of the opening of the recess 10a measured along the reference plane L (a length along the X-axis, the Y-axis, or the middle of these axes) in a cross-sectional photograph including the recess 10a.

In the present embodiment, the recess 10a having a predetermined pattern is formed by, for example, laser irradiation. Specifically, the upper surface 4a of the element body 4 is irradiated with a laser in a predetermined indication pattern. The recess 10a having the predetermined pattern is thus formed on the upper surface of the element body 4. An inner surface of the recess 10a tends to have a fine powder being observed to a larger degree compared to the inside of the element body 4.

A portion not irradiated with the laser becomes a plane where the recess 10a is not formed, along the reference plane L. There may be fine unevenness to some extent according to, for example, deviation of the particle size of the metal particles 12 and a surface thickness of the resin 14. In the present embodiment, the inner surface of the recess 10a or a surface of the element body 4 on which the recess 10a is not formed may include a resin-rich portion 14a.

While a thickness of the resin 14 of the resin-rich portion 14a is not limited, the thickness is preferably about 1 μm or more to about 30 μm or less. The resin-rich portion 14a may be formed around relatively large metal particles 12 in the inner surface of the recess 10a. The metal particles 12 are not necessarily exposed directly on the inner surface of the recess 10a.

In the present embodiment, the predetermined depth D1 of the recess 10a is preferably shallower than D90 of the metal particles 12 included in the metal particle dispersion element 15 and is more preferably shallower than D80 thereof. Additionally, the predetermined depth D1 of the recess 10a is preferably deeper than D50 of the metal particles 12 included in the metal particle dispersion element 15 and is more preferably deeper than D60 thereof. Further, an aspect ratio (AS ratio) calculated by dividing the opening width W1 of the recess 10a by the predetermined depth D1 of the recess 10a is preferably larger than 2 and smaller than 5.5, and is more preferably 2.4 to 5.4.

Examples of a symbol represented by the indication pattern formed as the recess 10a include characters and numerals, or, barcodes, two-dimensional codes, data matrix codes, QR codes (registered trademark), Aztec codes, and maxi codes. However, the symbol is not limited to these examples. Information that can be read from the symbol is not limited, and may be, for example, a model number of an electronic component, a manufacturing lot number, an identification symbol representing performance of an electronic component, other identification symbols (e.g., an orientation of an electronic component), a production date, a production location, a production method, or a material.

Next, a method of manufacturing the inductor 2 of the present embodiment is described.

The element body 4 is first prepared. In the element body 4, the coil 5 is insert molded. The element body 4 is formed through press molding (e.g., heating and pressing molding), injection molding, or the like. As a raw material of the element body 4, a composite material having fluidity at the time of molding is used. Specifically, a composite material in which a raw material powder of the metal particles 12 and a binder (e.g., the thermoplastic resin or the thermosetting resin) are kneaded is used.

The composite material may appropriately include a solvent, a dispersant, or the like. When the metal particles 12 shown in FIG. 2 are constituted by the large particles, the medium particles, and the small particles, the metal particles 12 preferably have a predetermined proportion of each particle group in the entire raw material powder. Specifically, the proportion of the large particles is preferably 50 to 90 wt %, the proportion of the medium particles is preferably 5 to 30 wt %, and the proportion of the small particles is preferably 0 to 30 wt %.

Next, the insulating layer of each of the lead portions 6a exposed to a part of the bottom surface 4b of the element body 4 is removed. Then, the corresponding terminal electrodes 8 are formed on the bottom surface 4b. Thus, each of the lead portions 6a and the corresponding terminal electrode 8 are connected.

The terminal electrodes 8 are formed as follows, for example. First, a resin electrode paste is applied to a part of the bottom surface 4b of the element body 4 using a method such as a printing method. At this time, the resin electrode paste is applied to cover the part of the bottom surface 4 where each of the lead portions 6a is exposed.

The resin electrode paste includes a binder to be the resin component and a metal raw material powder to be the conductor powder. The average particle size of the metal raw material powder of the present embodiment is preferably 1 to 10 μm and more preferably 3 to 5 μm.

After the resin electrode paste is applied to the element body 4, the element body 4 is heated under predetermined conditions to harden the binder (resin component) in the paste. The heating conditions may be appropriately determined in accordance with the type of the binder used. In this manner, the resin electrode layer is formed on the bottom surface 4b and the end surfaces 4c and 4d of the element body 4. On an outer surface of the resin electrode layer, a plating film or a sputtering film may be appropriately formed. For example, a plating film such as a Ni, Cu, or Sn film may be formed on the outer surface of the resin electrode layer to form the terminal electrodes 8. The inductor 2 having the pair of terminal electrodes 8 formed on the element body 4 is thus obtained.

After that, or before the terminal electrodes 8 are formed, the indicator area 10 is formed through, for example, laser irradiation to a part of the upper surface 4a of the element body 4 where the terminal electrodes 8 are not formed.

The upper surface 4a of the element body 4 is irradiated with the laser in the predetermined indication pattern. The recess 10a having the predetermined pattern is thus formed on the upper surface 4a of the element body 4, as shown in FIG. 2. An output and the number of shots of an energy light (e.g., the laser) are not limited and are determined so that the recess 10a has the predetermined depth D1 and the predetermined AS ratio.

At the recess 10a, the resin 14 may be included in, for example, a gap between the adjacent metal particles 12, or, some of the metal particles 12 may be partly covered with the resin 14. Alternatively, the resin-rich portion 14a may be formed.

The laser used for forming the indication pattern of the indicator area 10 preferably has a wavelength of 400 nm or less. That is, the laser is preferably a UV laser or the like having a wavelength shorter than that of a green laser (wavelength: 532 nm). Using a laser having a short wavelength as described above enables easy formation of the recess 10a.

At the indicator area 10 on an outer surface the upper surface 4a) of the element body 4 of the inductor 2 of the present embodiment, the recess 10a is formed by, for example, laser irradiation, in accordance with the particle size distribution of the metal particles 12 included in the metal particle dispersion element 15 so that the recess 10a is not deeply engraved but has a depth shallower than D90 of the metal particles 12. With the above configuration, information reading accuracy improves.

The recess 10a is formed through energy light (e.g., laser) irradiation. A laser output at the time of irradiation may be smaller than a conventionally required laser output, and the recess 10a can be formed with a small amount of irradiation time. Consequently, an indicator (e.g., a barcode and a two-dimensional code) can be marked on a surface of the element body 4 easily and directly. Formation of an elaborate indication pattern is also made possible, and formation of the indicator area on an extremely small electronic component is also enabled. Additionally, with the predetermined range of the AS ratio of the recess 10a, information reading accuracy further improves.

Using a method of reading information from the inductor of the present embodiment, information included in the indicator area 10 can be read from a reflected light reflected off a red light or a specific light having a wavelength shorter than that of the red light emitted to the indicator area 10 of the above-described inductor 2.

Typically, the red light is preferably used as an irradiation light. However, the specific light having a wavelength shorter than that of the red light enables easy recognition of characters and symbols at the indicator area 10. Particularly, the specific light preferably has a wavelength shorter than that of a green light (G), more preferably has a wavelength shorter than that of a blue light (B), and is particularly preferably a UV light.

The present invention is not limited to the above-described embodiment and can be modified variously within the scope of the present invention.

For example, while the indicator area 10 is formed on the upper surface 4a of the element body 4 in the above-described embodiment, the indicator area 10 may be formed on other outer surfaces of the element body 4 where the terminal electrodes 8 are not formed, such as the end surfaces or the bottom surface 4b of the element body 4.

Additionally, the element body 4 does not necessarily have the coil 5 built in, and may be a core having a shape of, for example, an FT type, an ET type, an EI type, a UU type, an EE type, an EER type, a UI type, a drum type, a toroidal type, a pot type, or a cup type.

The electronic component according to the present invention is not limited to the inductor, and may be an electronic component such as a transformer, a choke coil, a common mode filter, and a capacitor, or a composite electronic component combining an inductor element and another element such as a capacitor element. Further, the metal particles of the metal particle dispersion element constituting the element body are not limited to magnetic particles and may be metal particles with no magnetism or non-metal particles (e.g., sintered particles) such as a ceramic.

EXAMPLES

Hereinafter, the present invention is described based on further detailed examples. However, the present invention is not limited to these examples.

Example 1

Samples of an element body 4 shown in FIGS. 1 and 2 were manufactured. An X-Z axis cross section of each of the element bodies 4 was observed. With a cross-sectional photograph within a size of 80×80 μm, a particle size distribution of metal particles 12 was calculated using a SEM. Average D50 of ten samples was 12.7 μm. Average D90 of ten samples was 41.0 μm.

An upper surface 4a of each of the element bodies 4 manufactured under the same conditions was irradiated with a laser under different conditions. The samples of Sample Nos. 1 to 6 and 10 to 15 each having an indicator area 10 were thus prepared. Each indicator area 10 where a two-dimensional barcode was formed as a recess 10a had a depth D1 and an aspect ratio (AS ratio) different from the indicator area 10 of the other samples. A read percentage was then measured. FIGS. 3 and 4 show results.

In measurement of the read percentage, a two-dimensional code reader was used to read information from the indicator area 10 five to twenty times, and whether the read information was consistent with encoded data was checked. For example, a read percentage of 100% indicates that the encoded data and the read information were consistent in all the times of reading.

In FIGS. 3 and 4, power indicates a laser output in comparison with Sample No. 1 having a power of 100%, which is used as a benchmark. Power of other Samples is shown as a percentage with respect to the laser output of Sample No. 1. Additionally, a print number of times of 300% means that the number of shots of the laser was three as in Sample No. 1 used as a benchmark, and indicates that the number of shots of the laser along the same pattern of the recess 10a was three.

In FIGS. 3 and 4, speed indicates a speed of laser irradiation along a predetermined pattern of the recess 10a. The slower the irradiation speed, the deeper a predetermined depth D1 of the recess 10a tends to be. Based on the data shown in FIGS. 3 and 4, FIG. 5 is a graph showing a relationship between the predetermined depth (engraving depth) D1 and the read percentage, and FIG. 6 is a graph showing a relationship between the AS ratio and the read percentage.

Figure 5:
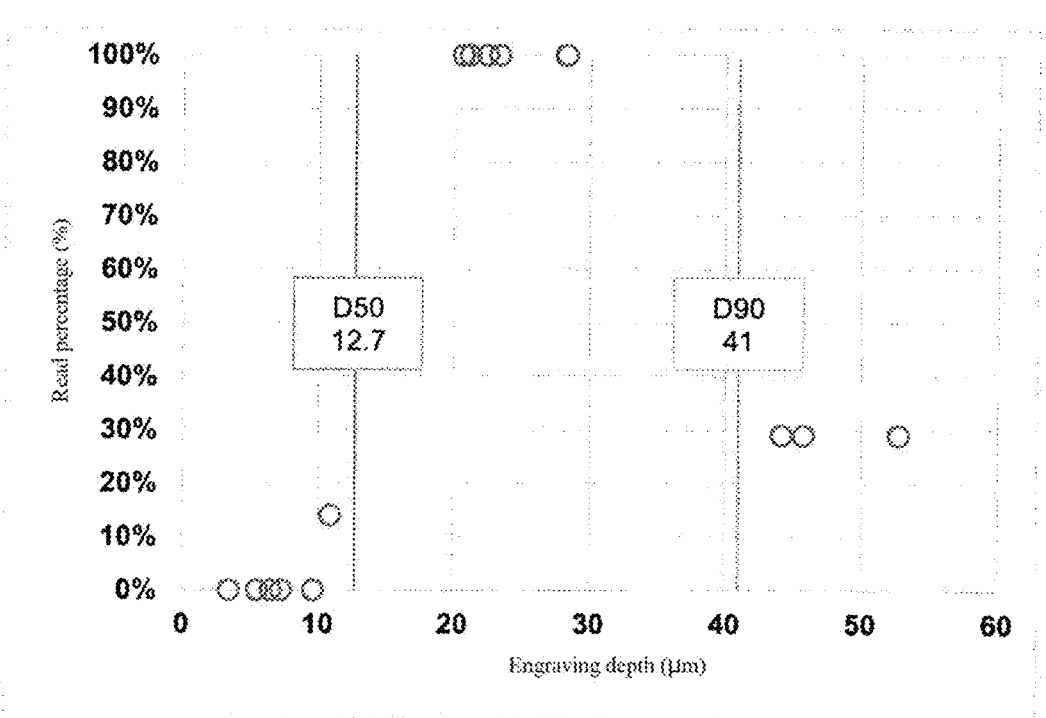
FIG. 5 is a graph showing a relationship between a depth and a read percentage of a recess in an example and a comparative example of the present invention.

As shown in FIG. 5, it was confirmed that, when the predetermined depth D1 of the recess 10a was preferably shallower than D90 of the metal particles 12 included in a metal particle dispersion element 15 and was more preferably shallower than D80 thereof, the read percentage improved. It was also confirmed that, when the predetermined depth D1 of the recess 10a was deeper than D50 of the metal particles 12 included in the metal particle dispersion element 15 and was more preferably deeper than D60 thereof, the read percentage improved.

The predetermined depth D1 of the recess 10a of the present example was preferably shallower than 41 μm, more preferably shallower than 30 μm, preferably deeper than 12.7 μm, and more preferably deeper than 20 μm.

Figure 6:
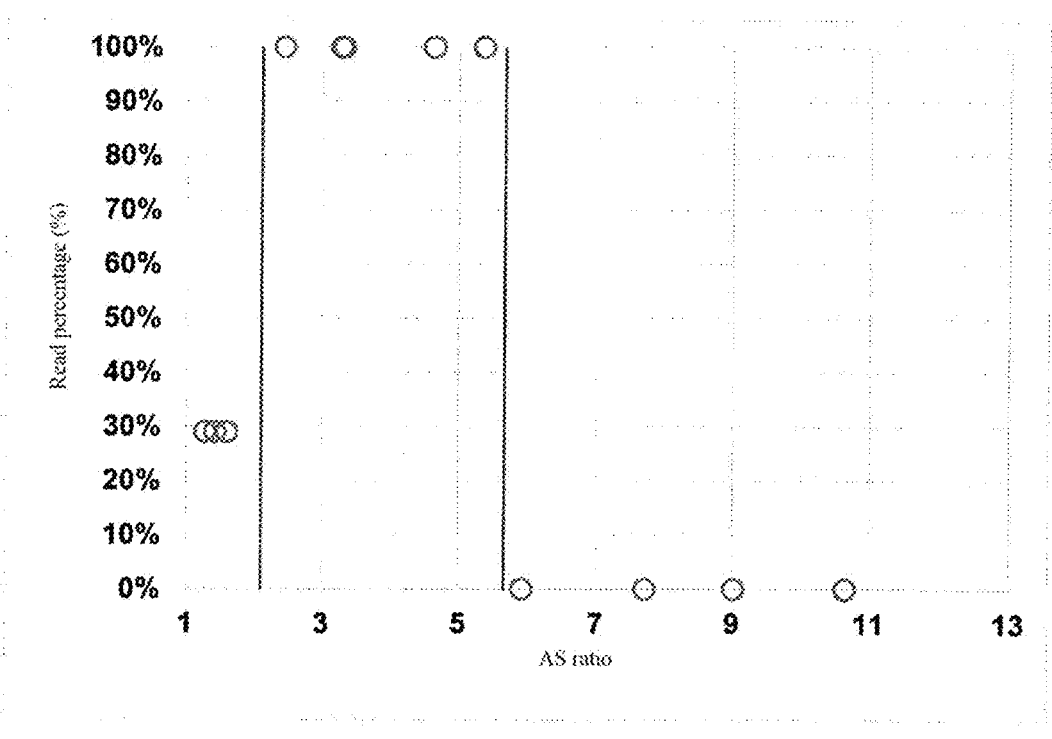
FIG. 6 is a graph showing a relationship between an aspect ratio (AS ratio) and a read percentage of a recess in an example and a comparative example of the present invention.

Additionally, as shown in FIG. 6, the aspect ratio (AS ratio) of the recess 10a was preferably larger than 2 and smaller than 5.5 and was more preferably 2.4 to 5.4.

DESCRIPTION OF REFERENCE NUMERALS

2 . . . inductor
4 . . . element body
   4a . . . upper surface
   4b . . . bottom surface
   4c, 4d . . . end surface
5 . . . coil
6 . . . wire
   6a . . . lead portion
8 . . . terminal electrode
10 . . . indicator area
   10a . . . recess
12 . . . metal particle
14 . . . resin
   14a . . . resin-rich portion
15 . . . metal particle dispersion element
L . . . reference plane

What is claimed is:
1. An electronic component comprising an element body, wherein
the element body includes a metal particle dispersion element in which metal particles are dispersed, a surface of the metal particle dispersion element includes an indicator area, the indicator area includes a recess having a predetermined depth measured from a reference plane of the metal particle dispersion element, the predetermined depth is shallower than D90 of the metal particles included in the metal particle dispersion element, the predetermined depth is deeper than D60 of the metal particles included in the metal particle dispersion element, and an aspect ratio calculated by dividing an opening width of the recess by the predetermined depth is 2.4 to 5.4.

2. The electronic component according to claim 1, wherein an inner surface of the recess includes a resin-rich portion.

3. The electronic component according to claim 1, wherein the predetermined depth is shallower than D80 of the metal particles included in the metal particle dispersion element.

4. An electronic component comprising an element body, wherein the element body includes a sintered particle dispersion element in which sintered particles are dispersed, a surface of the sintered particle dispersion element includes an indicator area, the indicator area includes a recess having a predetermined depth measured from a reference plane of the sintered particle dispersion element, the predetermined depth is shallower than D90 of the sintered particles included in the sintered particle dispersion element, the predetermined depth is deeper than D60 of the metal particles included in the sintered particle dispersion element, and an aspect ratio calculated by dividing an opening width of the recess by the predetermined depth is 2.4 to 5.4.

5. The electronic component according to claim 4, wherein the predetermined depth is shallower than D80 of the sintered particles included in the sintered particle dispersion element.

\* \* \* \* \*